(No Model.) 3 Sheets—Sheet 1.
M. VEGA.
PHOTOGRAPHIC CAMERA.
No. 452,926. Patented May 26, 1891.
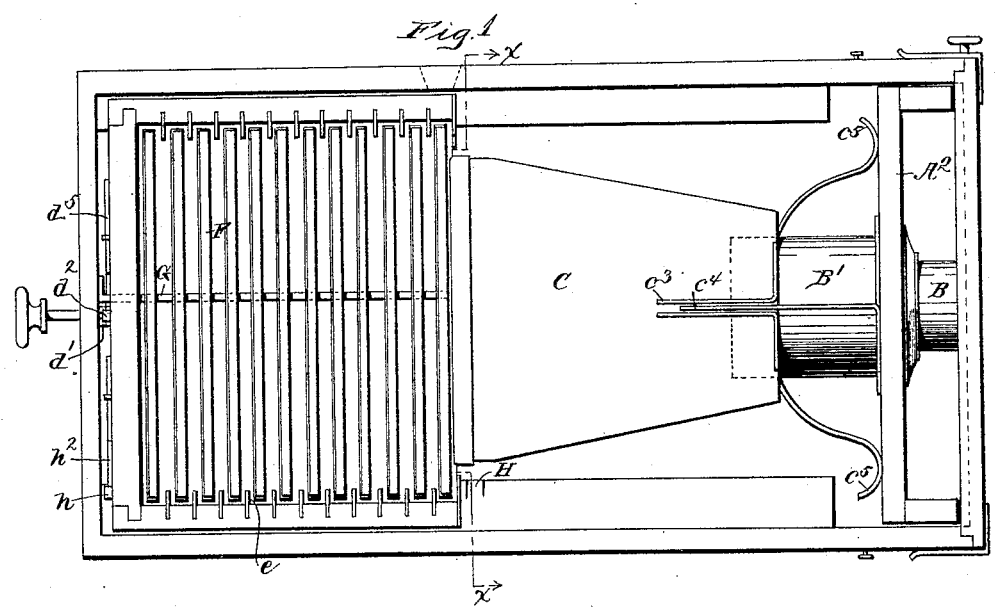
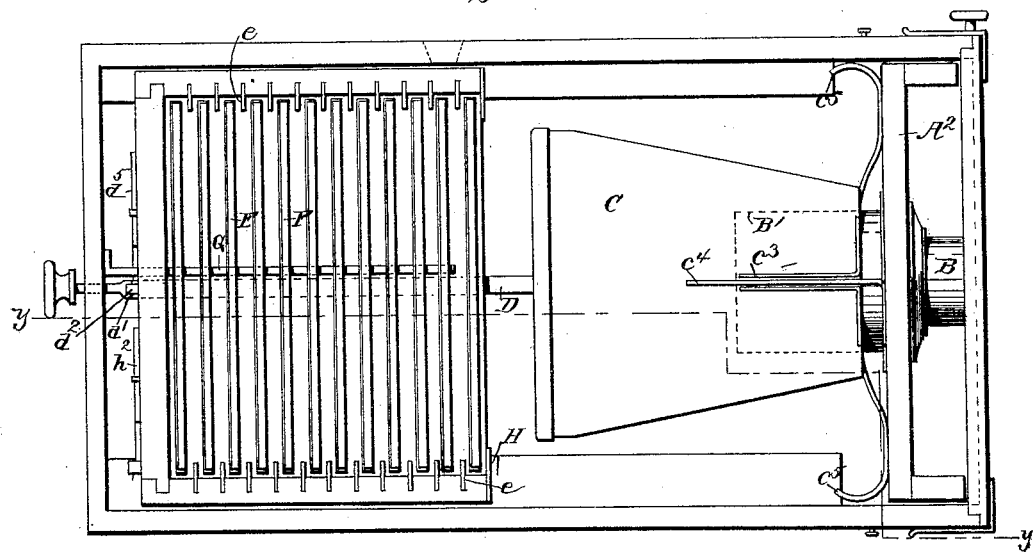
Witnesses
Inventor
Marino Vega
By his Attorney
Edwin H. Brown

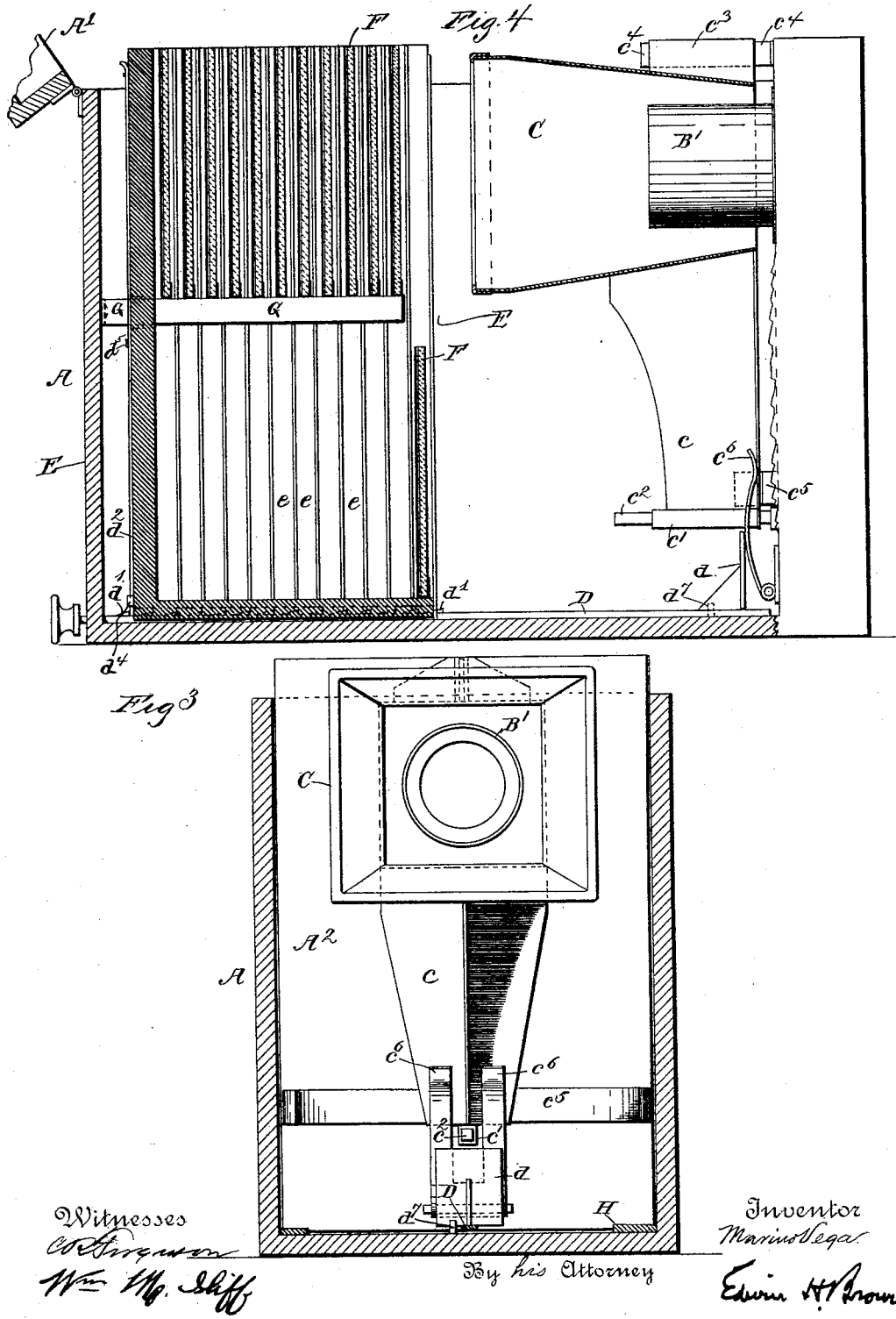

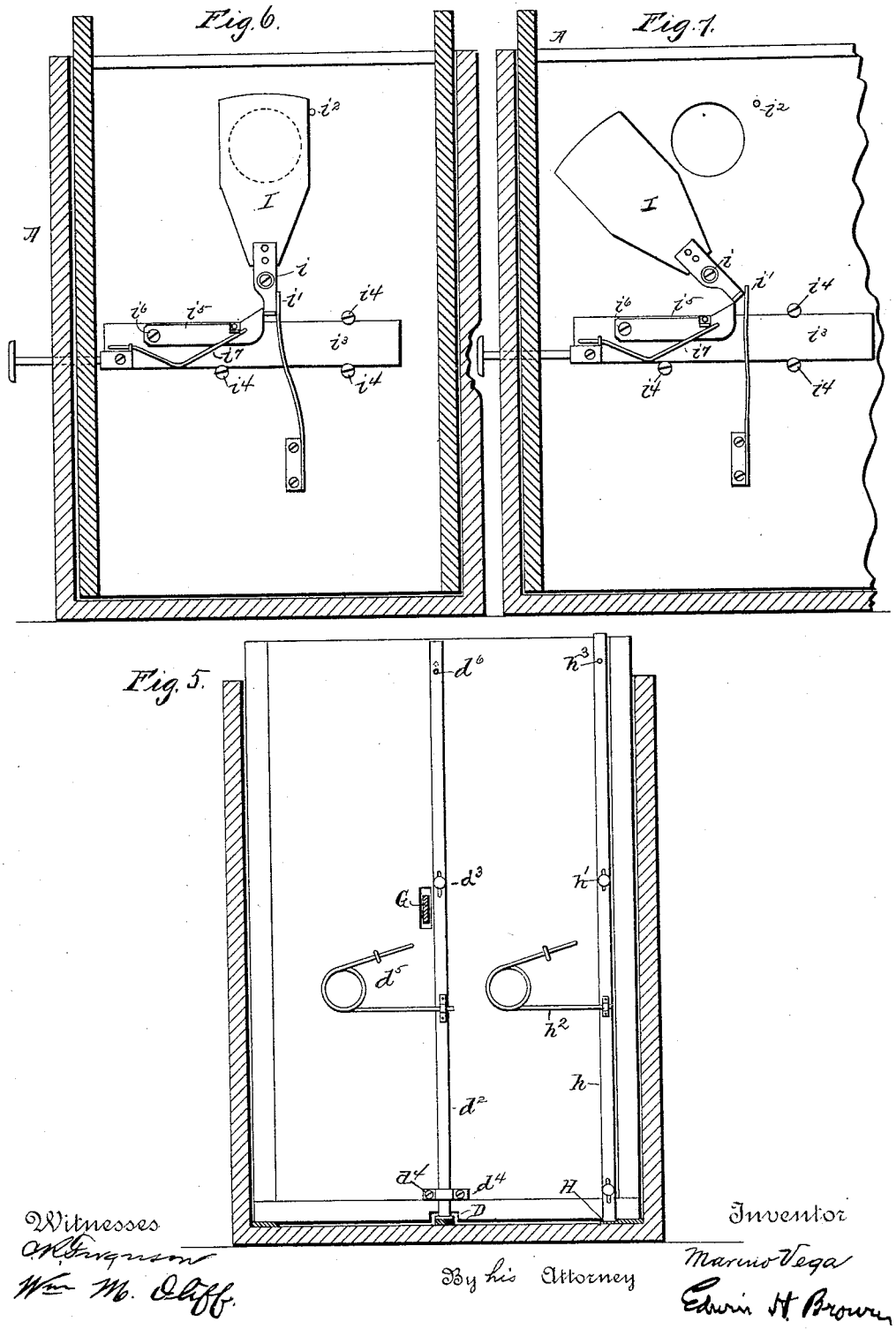

UNITED STATES PATENT OFFICE.

MARINO VEGA, OF NEW YORK, N. Y., ASSIGNOR TO THE SCOVILL & ADAMS COMPANY, OF SAME PLACE.

PHOTOGRAPHIC CAMERA.

SPECIFICATION forming part of Letters Patent No. 452,926, dated May 26, 1891.

Application filed November 13, 1890. Serial No. 371,288. (No model.)

*To all whom it may concern:*

Be it known that I, MARINO VEGA, a citizen of the Republic of Mexico, residing at New York, in the county and State of New York, have invented a certain new and useful Improvement in Photographic Cameras, of which the following is a specification.

My improvement relates to what are generally known as "magazine cameras," wherein a number of plates or plate-holders while in a position opposite the lens-tube are successively exposed.

In the accompanying drawings, Figure 1 is a top view of a camera embodying my improvement with the top or cover removed. Fig. 2 is a similar view showing certain parts in a different position. Fig. 3 is a vertical section taken at the plane of the dotted line $x\ x$, Fig. 1, looking in the direction indicated by the arrow at the upper end of said line. Fig. 4 is a partial section and partial side elevation of the camera, the section being taken at the plane of the dotted line $y\ y$, Fig. 2. Fig. 5 is a transverse section of the camera, taken rearward of a magazine, which it comprises. Fig. 6 is a transverse section taken in rear of the front of the camera-body. Fig. 7 is a similar view showing the parts in a different position.

Similar letters of reference designate corresponding parts in all the figures.

A designates the case of the camera. It may be of any suitable construction. As here shown, it is provided with a hinged cover or top A'. Any suitable catches may be employed for fastening this cover.

B designates the lens-tube. Any suitable shutter or cap may be used in connection with the same. In rear of it extends a larger tube B', which, as here shown, is fastened to a partition $A^2$, arranged vertically in the camera a short distance in rear of the front of the body.

C designates a hood, which may advantageously be made of rectangular cross-section, of a size at the forward end to surround the tube B' and of a size at the rear end to fit around the portion of a plate which is to be exposed. This hood will preferably be made of sheet metal, faced with india-rubber at the rear end. It is supported in the camera-body, so as to be free to slide lengthwise thereof. This is accomplished in the present instance by providing it with a downwardly-extending shank $c$, of sheet metal or other material, terminating at the lower extremity in a tube $c'$, that fits upon a horizontal bar $c^2$. This bar is fastened to the partition $A^2$ and extends rearwardly therefrom. From the upper side of the hood a pair of wings or plates $c^3$ extend, and these embrace a rod $c^4$, that is fastened to the partition $A^2$ and extends rearwardly therefrom.

Springs are interposed between the hood C and the partition $A^2$ for the purpose of moving the hood rearwardly. As here shown, springs $c^5$ are fastened to the forward end of the hood and impinge upon the partition. Against the shank $c$ impinge two arms $c^6$, which at the lower end are hinged to the partition $A^2$. A rod D is fitted to slide along the bottom of the camera-body in the direction of the length of the latter, and near the forward end has a transverse projection $d$, which is adapted to press against the arm $c^6$. Consequently when the rod D is moved forward the arm $c^6$ will be swung forward and the hood C will be moved in this direction.

E designates a magazine consisting of an upper and lower compartment that is twice the height of the plates or plate-holders F which are to be used therein, so that these plate-holders may be arranged above a partition G, extending horizontally into the magazine, and may afterward be changed to a position wholly below the first position. This magazine is movable lengthwise of the camera-body; but its partition G is a stationary partition, and in the present instance consists merely of a rod which is fastened to the back of the camera-body.

The magazine E is open at the top and front and is provided with vertical ribs or strips $e$, which are so spaced as to form guides through which the plate-holders or plates F may slide vertically.

Originally all the plate-holders and plates will be arranged in the upper part of the magazine and will rest upon the stationary partition G. Each time a picture is taken the magazine is intended to be moved forward sufficiently far to bring the next plate into the position which the previous one occupied at the time it was exposed. Each time such a movement is imparted to the magazine one of the plate-holders or plates F will be carried beyond the stationary partition, and will then drop into the lower part of the magazine. The means here shown for impelling the magazine forward consists of the rod D, ratchet-teeth $d'$ being formed on the upper surface of the rod for this purpose. The back of the magazine is provided with a pawl $d^2$, and this is shown as consisting of a metal rod or strip connected to the back of the magazine by screws $d^3$, passing through longitudinal slots in the rod. A strap $d^4$, fastened to the back of the magazine, extends across the lower end of the rod, so as to prevent it from being sprung away from the magazine-back. A spring $d^5$ impels this rod downwardly so as to engage it with the ratchet-teeth of the rod D. If desired, the rod $d^2$ may be pulled up and retained in an elevated position by engaging a hole which is formed in it with a pin $d^6$ projecting from the magazine-back.

A rack-bar H is fastened to the bottom of the camera-body near one side. Its teeth are extended in the same direction as those of the rod D. A pawl $h$, consisting of a rod connected to the magazine-back by screws $h'$, extending through longitudinal slots in the rod, coacts with the rack-bar H. A spring $h^2$ impels this pawl-rod downwardly. It may be raised and fastened in an elevated position by engaging a hole, which is formed in it with a pin $h^3$, which extends from the magazine-back. The object of the rack-bar H and the pawl $h$ is to prevent the magazine from moving backward while the camera is in use. A pin $d^7$, here shown as made in the form of a screw inserted in the bottom of the camera-body and projecting upward behind the projection $d$ of the rod D, limits the rearward movement of the rod D.

The rear end of the rod D projects through the back of the camera. It is only movable a distance about equal to the length of one of its teeth. By pulling it back and pushing it forward again the magazine may be moved forward far enough to carry the foremost plate-holder or plate F beyond the stationary partition G, so that it will drop into the lower part of the magazine and bring the next into position for exposure. Each time the rod D is moved forward it will also move the hood forward, so as to cause the pressure of the same against the foremost plate-holder or plate F to be relaxed. This is to prevent the hood from interfering with the dropping of the plate-holder or plate.

I designates a shutter, which is made in the form of a lever and fulcrumed to the front of the camera-body by means of a screw $i$, passing through it intermediately of its ends. Against the lower end a spring $i'$ impinges, and this serves to swing the upper end of the shutter-lever against a stop, here shown as consisting of a screw $i^2$. When the shutter is in this position, it will close the aperture through which the exposure takes place. Beneath the shutter-lever a bar $i^3$ is fitted to slide horizontally. As here shown, it is guided by screws $i^4$. A pawl $i^5$ is pivoted by a pin $i^6$ to the bar $i^3$ and is pressed upward by a spring $i^7$. The slider-bar $i^3$ has a handle, which extends to one side of the camera-body. When the slider-bar is pushed inward by pressure upon the handle, the pawl $i^5$ contacts with the lower end of the shutter-lever and swings the forward end of the shutter away from the aperture with which it co-operates. After the slider-bar has moved a short distance the pawl will, however, escape from the lower end of the shutter-lever, and the shutter-lever will thereupon be returned to its normal position by the spring $i'$. When the slider-bar is pulled outward, the pawl can move downwardly, so as to pass by the lower end of the shutter-lever.

What I claim as my invention, and desire to secure by Letters Patent, is—

1. In a camera, the combination of a magazine movable toward the front of the camera, a hood within the camera-body, mechanism for moving both the magazine and hood, and a partition or support which, on the forward movement of the magazine, will cease to support plate-holders or plates in the upper part of the magazine, substantially as specified.

2. In a camera, the combination of a magazine movable toward the front of the camera-body, a hood within the camera-body, mechanism for moving both the magazine and hood, and a stationary partition or support which, on the forward movement of the magazine, will cease to support plate-holders or plates in the upper part of the magazine, substantially as specified.

3. In a camera, the combination of a magazine movable toward the front of the camera-body, and a partition or support which, on the forward movement of the magazine, will cease to support plate-holders or plates in the upper part of the magazine, and a reciprocating ratcheted rod for moving the magazine in one direction, substantially as specified.

4. In a camera, the combination of a magazine movable toward the front of the camera-body, a partition or support which, on the forward movement of the magazine, will cease to support plate-holders or plates in the upper part of the magazine, a ratcheted bar movable lengthwise of the camera-body, a pawl attached to the magazine and engaging with the ratcheted bar, a stationary rack-bar in the camera-body, and a pawl on the magazine engaging with such stationary rack-bar, substantially as specified.

5. In a camera, the combination of a shutter made in the form of a lever, a spring for impelling it in one direction, a slider-bar for impelling it in the other direction, and a pawl pivoted to the slider-bar and coacting with the shutter-lever, substantially as specified.

6. In a camera, the combination, with a magazine, of a hood movably arranged between the magazine and front of the camera, and means, substantially such as described, for moving the hood, substantially as specified.

7. In a camera, the combination, with a movable magazine, of a hood arranged between the magazine and the front of the camera, a rod for moving the hood in one direction, and means independent of the rod for moving it in the reverse direction, substantially as specified.

8. In a camera, the combination, with a magazine, of a hood arranged between the magazine and a lens, a downwardly-extending shank on the hood, having a tubular portion, a horizontal bar extending from a portion of the camera-body and fitted within said tubular portion, a guide arranged at the upper portion of the hood, a sliding bar for moving the hood in one direction, and a spring or springs for moving it in the reverse direction, substantially as specified.

In testimony whereof I have signed my name to this specification in the presence of two subscribing witnesses.

MARINO VEGA.

Witnesses:
S. O. EDMONDS,
C. R. FERGUSON.